(12) United States Patent
Martin (10) Patent No.: US 11,044,073 B2
(45) Date of Patent: Jun. 22, 2021

(54) COUNTERMEASURES AGAINST AN ATTACK BY ANALYSIS OF ELECTRICAL CONSUMPTION FOR A CRYPTOGRAPHIC DEVICE

(71) Applicant: Rambus, Inc., Sunnyvale, CA (US)

(72) Inventor: Michel Martin, Rognes (FR)

(73) Assignee: Rambus, Inc., San Jose, CA (US)

( * ) Notice: Subject to any disclaimer, the term of this patent is extended or adjusted under 35 U.S.C. 154(b) by 417 days.

(21) Appl. No.: 15/463,364

(22) Filed: Mar. 20, 2017

(65) Prior Publication Data

US 2017/0195114 A1 Jul. 6, 2017

Related U.S. Application Data

(63) Continuation of application No. PCT/FR2015/052544, filed on Sep. 23, 2015.

(30) Foreign Application Priority Data

Sep. 23, 2014 (FR) ...................................... 1458951

(51) Int. Cl.
  *G06F 11/30* (2006.01)
  *G06F 12/14* (2006.01)
  (Continued)

(52) U.S. Cl.
  CPC .............. *H04L 9/003* (2013.01); *G06F 21/72* (2013.01); *G06F 21/755* (2017.08)

(58) Field of Classification Search
  CPC combination set(s) only.
  See application file for complete search history.

(56) References Cited

U.S. PATENT DOCUMENTS 6,003,777 A * 12/1999 Kowalski ............. G06K 7/0008
  235/439
6,507,130 B1 1/2003 Thueringer et al.
  (Continued)

FOREIGN PATENT DOCUMENTS

EP 1022683 A2 7/2000
EP 1098267 A1 5/2001
  (Continued)

OTHER PUBLICATIONS

"A. Marshall, J. Devore, Power IC with EEPROM programmable switch mode regulators, Sep. 1996, IEEE Xplore, pp. 1351-1356" (Year: 1996).*

(Continued)

*Primary Examiner* — Phy Anh T Vu
(74) *Attorney, Agent, or Firm* — Lowenstein Sandler LLP (57) ABSTRACT

In a general aspect, a countermeasure method implemented in a microcircuit can include selecting, at each cycle of a clock signal, a supply mode of a component internal to the microcircuit, the supply mode can be selected from among a first supply mode in which the component is fully supplied by a first supply circuit connected to a supply input of the microcircuit, and at least one second supply mode in which the component is at least partially supplied by a second supply circuit internal to the microcircuit. The second supply circuit can be isolated from the exterior of the microcircuit while it is supplying the component.

21 Claims, 6 Drawing Sheets

(51) Int. Cl.
*H04L 9/00* (2006.01)
*G06F 21/72* (2013.01)
*G06F 21/75* (2013.01)

(56) References Cited

U.S. PATENT DOCUMENTS

| | | | | |
|---|---|---|---|---|
| 6,594,760 | B1* | 7/2003 | Ryan, Jr. | G06F 21/72 |
| | | | | 713/189 |
| 6,944,246 | B1* | 9/2005 | Senba | G06K 19/0723 |
| | | | | 375/354 |
| 8,665,614 | B2* | 3/2014 | Lombardo | H02M 3/33523 |
| | | | | 363/21.12 |
| 9,620,101 | B1* | 4/2017 | Thandri | H02M 3/07 |
| 2004/0158728 | A1* | 8/2004 | Kim | G06K 19/073 |
| | | | | 713/194 |
| 2004/0260932 | A1* | 12/2004 | Blangy | G06F 21/75 |
| | | | | 713/189 |
| 2006/0179329 | A1* | 8/2006 | Terechko | G06F 1/3203 |
| | | | | 713/300 |
| 2007/0253125 | A1* | 11/2007 | Kuroda | G11C 29/12005 |
| | | | | 361/18 |
| 2009/0095955 | A1* | 4/2009 | Kim | G06K 19/0723 |
| | | | | 257/48 |
| 2009/0295349 | A1* | 12/2009 | Tao | H02M 3/33507 |
| | | | | 323/282 |
| 2012/0210138 | A1 | 8/2012 | Tucker | |
| 2013/0301311 | A1* | 11/2013 | Wang | H02M 3/33515 |
| | | | | 363/21.13 |
| 2014/0035628 | A1* | 2/2014 | Oaklander | H03K 17/063 |
| | | | | 327/109 |
| 2014/0132337 | A1 | 5/2014 | Yannette et al. | |
| 2015/0002122 | A1* | 1/2015 | Cho | H03K 17/163 |
| | | | | 323/283 |
| 2015/0214955 | A1* | 7/2015 | Calhoun | G06F 1/3287 |
| | | | | 331/47 |
| 2017/0373837 | A1* | 12/2017 | Gagnerot | G06F 21/568 |

FOREIGN PATENT DOCUMENTS

| | | |
|---|---|---|
| EP | 1113386 A2 | 7/2001 |
| GB | 2398139 A | 8/2004 |
| WO | 02080094 A1 | 10/2002 |
| WO | 2004025444 A2 | 3/2004 |

OTHER PUBLICATIONS

"Slavo Kicin, Felix Traub, Samuel Hartmann, Enea Bianda, Christof Bernhard, Stanislav Skibin, Francisco Canales, A new concept of a high-current power module allowing paralleling of many SiC devices assembled exploiting conventional packaging technologies, Jun. 12-16, 2016, IEEE Xplore, INSPEC#16178059" (Year: 2016).*

"Syun Ho Park, Seung-Hyun Song, Sang-Tae Han, Tae-Sun Jang, Jin-Hwan Jung, Hark-Byeong Park, Estimation of Power Switching Current by Chip-Package-PCB Cosimulation, May 10, 2010, IEEE Xplore, pp. 311-319" (Year: 2010).*

International Search Report from PCT/FR2015/052544, dated Jan. 15, 2016, 4 pages.

SHAMIR, "Protecting Smart Cards from Passive Power Analysis with Detached Power Supplies", Cryptographic Hardware and Embedded Systems, 2nd International Workshop, CHES 2000 Proceedings (Lecutre Notes in Computer Science), vol. 1965, No. 17, XP001049129, 2000, 71-77.

* cited by examiner

COUNTERMEASURES AGAINST AN ATTACK BY ANALYSIS OF ELECTRICAL CONSUMPTION FOR A CRYPTOGRAPHIC DEVICE

CROSS-REFERENCE TO RELATED APPLICATIONS

This application is a continuation of PCT/FR2015/052544, filed Sep. 23, 2015 which claims the benefit of French Application No. 1458951, filed Sep. 23, 2014, the disclosures of which are both incorporated by reference herein in their entireties.

TECHNICAL FIELD

The present disclosure relates to cryptographic devices and more particularly, to the protection of such devices against attacks by analysis of their electrical consumption. The present disclosure, relates, in particular to smart cards, secured processors, secured telephones, and more generally to any device with a microcircuit storing sensitive data and thus needing to be protected against attacks by analysis of electrical consumption.

BACKGROUND

Microcircuit devices handling sensitive data are sometimes subject to attacks aiming to determine this data. Among known attacks, attacks of SPA (Simple Power Analysis) or DPA (Differential Power Analysis) type involve performing many measurements of current on a microcircuit supply terminal during the execution of a program or of a data processing operation by the microcircuit, by causing input data to vary. The measurements obtained are used by a statistical analysis to deduce sensitive data, processed or used by the microcircuit.

Various techniques have been developed to fight against these attacks. Thus, one known example is to reduce the leakage currents induced by the processing operations, or to increase the noise so as to reduce the signal/noise ratio of the variations of the supply current. Balancing the sensitive circuits, so that the processing of a bit on 0 has a same electrical consumption signature as the processing of a bit on 1, has also been considered. Introducing jitter in the clock signal has also been proposed, or introducing dummy calculations or dummy calculation cycles. It is also possible to mask intermediate data in the symmetrical algorithms. However these techniques result in increasing the size and the complexity of sensitive circuits, or in deteriorating their performances (electrical consumption and calculation execution time). It is also known to use capacitors having a relatively high capacitance to filter the variations in current at the supply input of the microcircuit. The higher the capacitance of the capacitor, the more the masking of the variations in electrical consumption of the circuit is efficient. However, the higher the capacitance of the capacitor, the more the volume of the latter is significant. Capacitors which can be integrated into a microcircuit currently have a capacitance insufficient to prevent attacks of SPA or DPA type.

It is thus desirable to implement a countermeasure aiming to protect circuits handling sensitive data against various types of SPA- and DPA-type attacks. It is also desirable not to adversely affect performances and size of a circuit to be protected.

SUMMARY

Some embodiments relate to a countermeasure method implemented in a microcircuit, the method comprising selecting at each cycle of a clock signal a supply mode of a component internal to the microcircuit, from among a first supply mode in which the component is fully supplied (e.g., with power, voltage, current, etc.) by a first supply circuit connected to a supply input of the microcircuit, and at least one second supply mode in which the component is at least partially supplied (with power) by a second supply circuit internal to the microcircuit, the second supply circuit being isolated from the exterior of the microcircuit while it is supplying the component. The selected supply mode may be activated while the component is active.

According to one embodiment, the component is supplied by the second supply circuit at cycles of the clock signal determined randomly, or depending on the state of charge of a capacitor of the second supply circuit, or depending on a criterion of sensitivity of operations executed upon each cycle of the clock signal.

According to one embodiment, the component is provided with the clock signal to pace operations executed by the component.

According to one embodiment, the component is supplied in the second supply mode by the discharge of a capacitor, the second supply mode being selected for a time that is shorter than the time of a cycle of the clock signal minus a charge time for charging the capacitor.

According to one embodiment, a first switch is interposed on a supply connection of the component, connected to the first supply circuit, the method comprising charging a capacitor of the second supply circuit when the first switch is closed, and of discharging the capacitor to supply the component when the first switch is open.

According to one embodiment, a second switch is interposed on a supply connection linking the second supply circuit to a supply input of the component, the capacitor being charged by a source of energy internal to the microcircuit when the second switch is open, and discharged to supply the component when the second switch is closed.

According to one embodiment, the method comprises: the component executing several times an operation with the first switch open for different times, the capacitor being in a charged state when the first switch is open, upon each execution of the operation, storing a datum provided by the calculation circuit, and determining a maximum time for which the first switch can be open without disturbing the execution of the operation by comparing the stored data.

According to one embodiment, the method comprises defining and storing in a register a control word comprising one control bit per cycle of a set of cycles of the clock signal, and of selecting one or other of the first and second supply modes, according to the value of the control bit corresponding to the clock cycle in progress in the register.

Some embodiments also relate to a microcircuit comprising: a component internal to the microcircuit, a first supply circuit connected to a supply input of the microcircuit, a second supply circuit internal to the microcircuit, and a control circuit configured to implement the method defined above.

According to one embodiment, the microcircuit comprises a first switch interposed on a supply line of the component, and which is closed by the control circuit to supply the component by the first supply circuit, and opened by the control circuit to supply the component by the second supply circuit.

According to one embodiment, the second supply circuit comprises a first capacitor that is charged while the first switch is closed, and which supplies the component by discharging while the first switch is open.

According to one embodiment, the microcircuit comprises a second switch interposed on a supply connection linking the second supply circuit to a supply input of the component, the first capacitor being charged by a source of energy internal to the microcircuit when the second switch is open, and discharged to supply the component when the second switch is closed.

According to one embodiment, the microcircuit comprises a register for storing a control word comprising at least one bit, the status of the bit indicating whether the first switch must be opened or closed during a calculation cycle of a set of calculation cycles executed by the component.

According to one embodiment, the microcircuit comprises several components each comprising a supply input coupled to the first supply circuit through a respective switch, a capacitor being connected to each supply input, each switch being controlled according to the operations executed by the component connected to the switch.

According to one embodiment, the microcircuit comprises several components each comprising a supply input coupled to the first supply circuit through a respective switch, a capacitor being coupled through a switch circuit to each component supply input, each switch being controlled according to the operations executed by the component connected to the switch, the switch circuit being configured to couple the capacitor to one of the component supply inputs when the switch connected to this supply input is open.

Some embodiments relate to a countermeasure method implemented in a microcircuit, the method comprising steps of: selecting, by the microcircuit, at each cycle of a clock signal a supply mode of a component internal to the microcircuit, from among a first supply mode in which the component is fully supplied by a first supply circuit connected to a supply input of the microcircuit, and at least one second supply mode in which the component is at least partially supplied by a second supply circuit internal to the microcircuit, the second supply circuit being isolated from the exterior of the microcircuit while it is supplying the component, charging a capacitor of the second supply circuit by a source of energy internal to the microcircuit, while the first supply mode is selected, and discharging the capacitor to supply the component while the second supply mode is selected. The selected supply mode may be activated while the component is active.

According to one embodiment, the component is supplied by the second supply circuit at cycles of the clock signal determined randomly, or depending on the state of charge of a capacitor of the second supply circuit, or depending on a criterion of sensitivity of operations executed upon each cycle of the clock signal.

According to one embodiment, the component is provided with the clock signal to pace operations executed by the component.

According to one embodiment, the second supply mode is selected for a time that is shorter than the time of a cycle of the clock signal minus a charge time for charging the capacitor.

According to one embodiment, a first switch is interposed on a supply connection of the component, connected to the first supply circuit, the method comprising a step of charging a capacitor of the second supply circuit when the first switch is closed, and of discharging the capacitor to supply the component when the first switch is open.

According to one embodiment, a second switch is interposed on a supply connection linking the second supply circuit to a supply input of the component, the capacitor being charged by the source of energy internal to the microcircuit when the second switch is open, and discharged to supply the component when the second switch is closed.

BRIEF DESCRIPTION OF DRAWINGS

Some examples embodiments are described below in relation with, but not limited to, the following figures, in which:

FIG. 1 schematically represents an example of a microcircuit performing cryptographic calculations, FIG. 2 schematically represents a power supply circuit and a sensitive circuit of the microcircuit in FIG. 1, FIGS. 3A and 3B represent curves of variation over time, respectively of a clock signal and of the intensity of the current at a power supply input of the microcircuit, during calculations performed by a component of the microcircuit, FIG. 4 schematically represents a power supply circuit and a sensitive circuit of the microcircuit, according to one embodiment, FIG. 5 schematically represents a circuit of the power supply circuit in FIG. 4, FIGS. 6A, 6B and 6C represent curves of variation over time, respectively of a clock signal, of a control signal and of the intensity of the current at a power supply input of the microcircuit, during calculations performed by a component of the microcircuit, the microcircuit being equipped with the supply circuit of FIG. 4, FIG. 7 schematically represents an example of a power supply circuit and several sensitive circuits of the microcircuit, according to another embodiment, FIG. 8 schematically represents an example of a power supply circuit and several sensitive circuits of the microcircuit, according to another embodiment, FIGS. 9, 10 and 11 schematically represent a power supply circuit and a sensitive circuit of the microcircuit, according to other embodiments.

DETAILED DESCRIPTION

Figure 1:
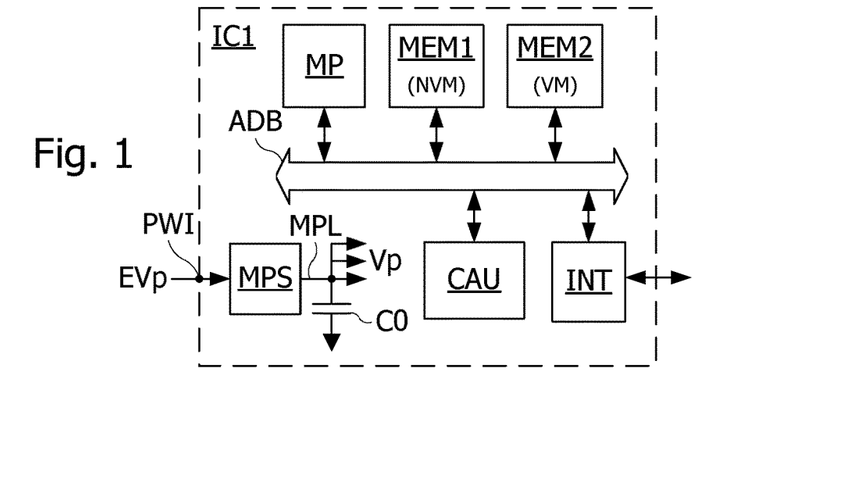

FIG. 1 represents an example of a microcircuit IC1 performing cryptographic calculations. In the description below, the word "microcircuit" means an integrated circuit or a silicon chip, into which it is difficult to insert a sensor for capturing signals to access sensitive data of the microcircuit. The microcircuit IC1 comprises several components such as a processor MP, for example of microprocessor or microcontroller type, one or more volatile and non-volatile memories MEM1, MEM2, an interface unit INT enabling the microcircuit IC1 to communicate with equipment external to the microcircuit, and address and data buses ADB to which the processor, the memories and the interface unit are connected. The microcircuit IC1 may also comprise components such as calculation circuits including a cryptographic calculation circuit CAU also connected to the bus ADB. The different components of the microcircuit IC1 are supplied (e.g., with power, voltage, current) by a supply circuit MPS providing a supply voltage Vp on a main supply connection MPL coupled to a ground plane of the microcircuit IC1 through a filtering capacitor C0. The circuit MPS may itself be connected to a supply terminal PWI of the microcircuit, receiving an external supply voltage EVp. It shall be noted that the supply terminal PWI may also be a connection terminal of a communication antenna, the then so-called "contactless" microcircuit IC1 generating its own supply from the energy received by the antenna. The circuit MPS may comprise circuits such as a voltage regulator and a charge pump. The circuit MPS may also be a simple connection with the supply terminal PWI. For purposes of this disclosure, supplying a component can be supplying power (current and voltage), supplying voltage, supplying current, etc.

Figure 2:
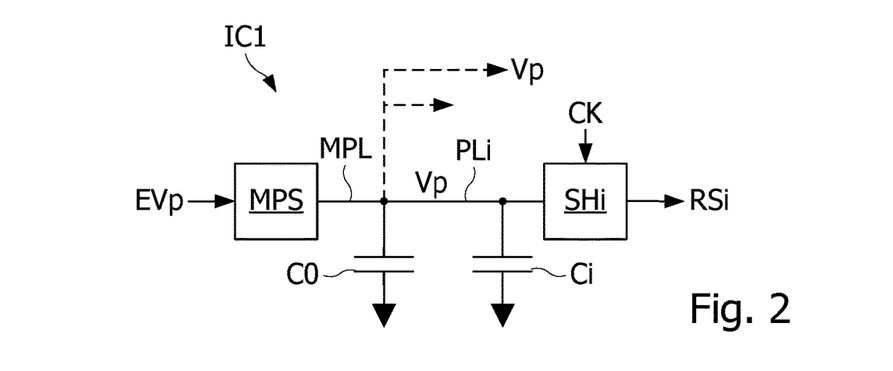

FIG. 2 represents in greater detail the supply circuit of one of the components SHi of the microcircuit IC1. Here, the component SHi may represent the processor MP, one or more calculation circuits of the microcircuit IC1, or a part of them. The component SHi receives the supply voltage Vp at a supply input coupled to the main supply connection MPL through a local supply connection PLi. The supply input of the component SHi is coupled to the ground plane through a capacitor Ci. The capacitor Ci may include the internal stray capacitances of the component SHi.

Figure 3A:
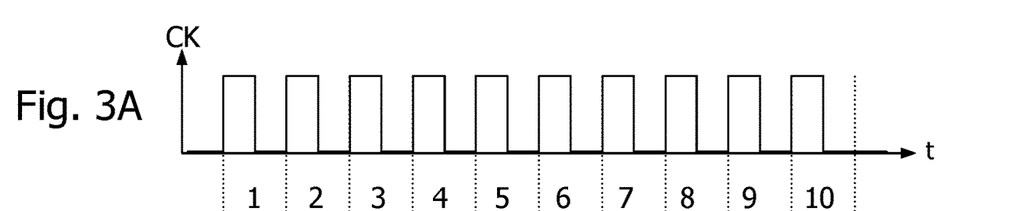
Figure 3B:
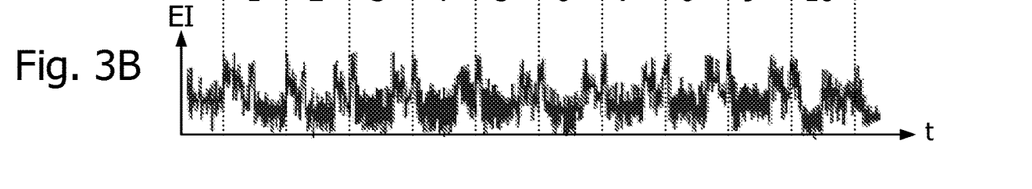

FIGS. 3A, 3B represent curves of variation over time, respectively of a clock signal CK and of the intensity of the electric current El on the supply terminal of the microcircuit IC1 during the execution of calculations by one of the components SHi. The clock signal CK may represent cycles or iterations of a calculation, such as rounds of a cryptographic calculation. FIG. 3A represents 10 periods of the signal CK. A correlation can be seen between the clock signal CK and the current El. An attack of DPA type involves acquiring several curves of the signal El with different input data and correlating these curves to deduce a sensitive datum used by the microcircuit.

Figure 4:
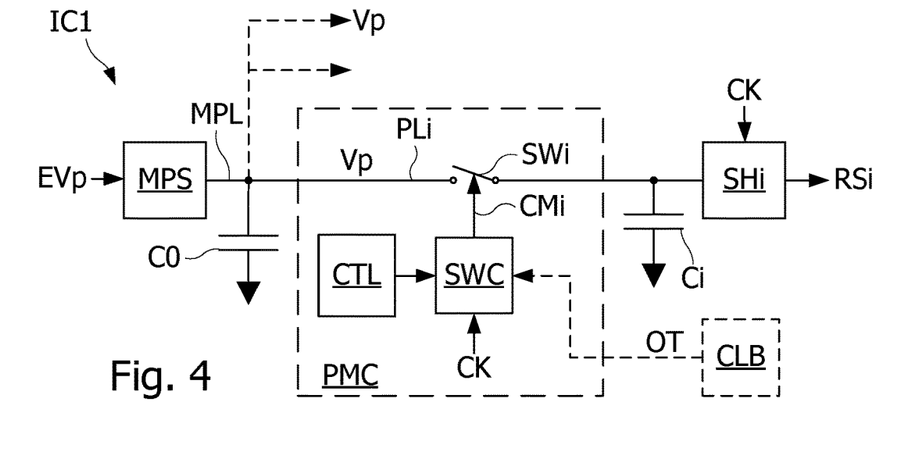

FIG. 4 represents the supply circuit of one of the components SHi of the microcircuit IC1, according to one embodiment. The supply circuit of the component SHi differs from the one represented in FIG. 2 in that it comprises a countermeasure circuit PMC. The countermeasure circuit PMC comprises a switch SW1 interposed on the local supply connection PLi of the component SHi, between the capacitors C0 and Ci. Thus, when the switch SWi is closed, the component SHi is supplied normally by the circuit MPS. When this switch is open, the component SHi is supplied temporarily by the discharge of the capacitor Ci. The countermeasure circuit PMC also comprises a control circuit SWC to control the switch SWi, and a control circuit CTL to control the control circuit SWC.

As the capacitor Ci is totally integrated into the microcircuit IC1 and uncoupled from the supply circuit and thus from the supply input PWI of the microcircuit, when it is supplying the component SHi, no external connection of the microcircuit grants access to the supply input of the component SHi when the latter is supplied by the capacitor Ci. It can also be seen that such integration of the capacitor Ci offers a much better protection than the simple disposition of several circuits in a same electronic component package. Indeed, a package can be opened relatively easily to access the inputs and outputs of the different components interconnected in the package. On the other hand, microcircuits are generally formed on a so-called "active" face of a wafer made of a semiconductor material, covered by different insulating and conducting layers in which interconnection lines are formed, these layers being covered by a protective layer, generally made of resin, comprising openings for the external connections of the microcircuit. Access to the connection terminals of the capacitor Ci or to the connection lines of the countermeasure circuit would thus require removing the protective layer of the microcircuit and one or more interconnection layers, and would thus cause the destruction of the microcircuit. Thus, as the countermeasure circuit PMC is also integrated into the microcircuit, it is not possible either to determine the periods during which the component SHi is supplied by the capacitor Ci.

The control circuit SWC may furthermore receive a control signal OT enabling the opening time OT of the switch SW1 to be adjusted. The control circuit CTL transmits to the circuit SWC a control signal CMi whereby it is possible to trigger the opening of the switch SHi for the time OT. The instants at which the opening of the switch SWi is triggered may be predetermined or determined randomly, as may the opening time of the switch SWi with an upper limit defined by the time OT.

The opening time OT may be determined according to the discharge time of the capacitor Ci so that during this time, the supply voltage provided by the capacitor Ci is sufficient to keep the component SHi operational. The opening time OT depends on the capacitance of the capacitor Ci and on the electrical consumption of the component SHi, which may vary over time depending on the operation executed by the component SHi. Thus, the control circuit SWC may be configured to open the switch SWi for the opening time OT, upon a command from the control circuit CTL. The control circuit SWC may also be configured to keep the switch SWi closed for a minimum closing time following the opening of the latter, so as to ensure the recharging of the capacitor Ci before the switch SWi can be opened again.

Provision may be made so that the time OT is such that the period of the clock signal CK is longer or equal to the sum of the time OT and of the recharging time of the capacitor Ci. Alternatively, provision may be made so that the time OT is between the period of the clock signal CK and half of the latter, and for prohibiting the opening of the switch SWi for at least two consecutive clock cycles CK. The time OT may also be chosen equal to a fraction of the period of the clock signal CK, the switch SWi being kept closed between two consecutive openings of the latter, for a minimum time that is sufficient to enable the recharging of the capacitor Ci. It will be understood that it is also possible for the time OT to be longer than that of one or more cycles of the clock signal CK.

The time OT may be determined by a calibration device CLB configured to execute several iterations during each of which it activates the component SHi, opens the switch SWi for a variable time and stores a result RSi provided by the component SHi in connection with the opening time of the switch SWi. The time OT is chosen from among the times stored that enable a correct result to be obtained from the component SHi, i.e. a result identical to the one obtained without opening the switch SWi. For example, the time OT chosen may be the longest time that enables a correct result to be obtained.

The control circuit SWC may also receive the clock signal CK provided to the component SHi or a synchronization signal provided by the component SHi, so as to synchronize the opening of the switch SWi according to the operations performed by the component SHi. In this case, the circuit SWC is configured to trigger the opening of the switch SWi when the signals CMi and CK are simultaneously in a given state, for example a high state.

The control circuit CTL may be controlled through a control word loaded in a register comprising several cells for storing a binary datum. Each cell of the register corresponds to an iteration of the calculation executed by the component SHi, the time of each iteration corresponding to the period of the signal CK. The value of each register cell determines whether the circuit CTL must or must not control the circuit SWC to open the switch SWi for the time OT, during the calculation iteration corresponding to the register cell. The control word loaded in the register may be determined according to a criterion of sensitivity of each iteration.

Figure 5:
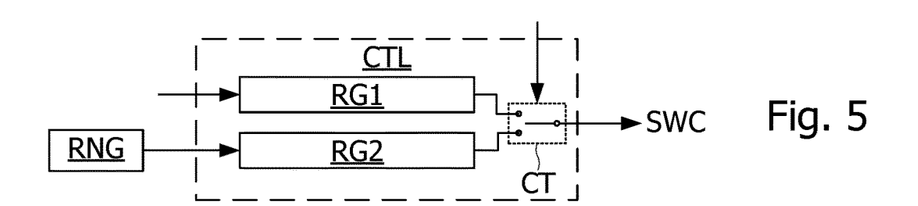

According to one embodiment, the control register of the control circuit CTL is coupled to a random number generator arranged for loading, on command, a new control word in the register. According to another embodiment shown by FIG. 5, the control circuit comprises two registers RG1, RG2, the register RG2 being coupled to a generator of random or pseudo random numbers RNG. The register RG1 may be updated by a component of the circuit IC1 such as the processor MP. The output of the registers RG1, RG2 is coupled to the control input of the circuit SWC through a selector switch CT that may be controlled to select one or the other of the two registers RG1, RG2 to be used to control the circuit SWC. If the time CK-OT is shorter than the charge time of the capacitor Ci, the control word loaded in the register RG2 may be modified so as to avoid it including two consecutive bits on 0 (in the event that a bit on 0 controls the opening of the switch SWi) to ensure the recharging of the capacitor Ci between two consecutive openings of the switch SWi.

Figure 6A:
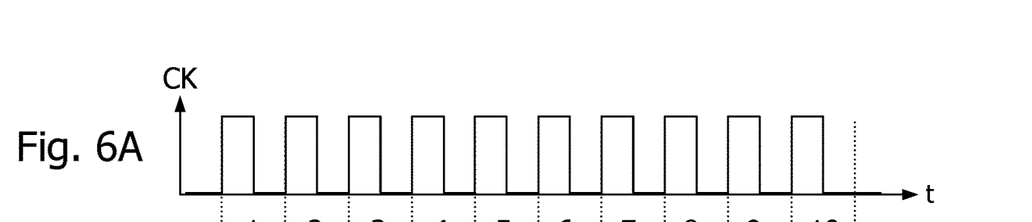
Figure 6B:
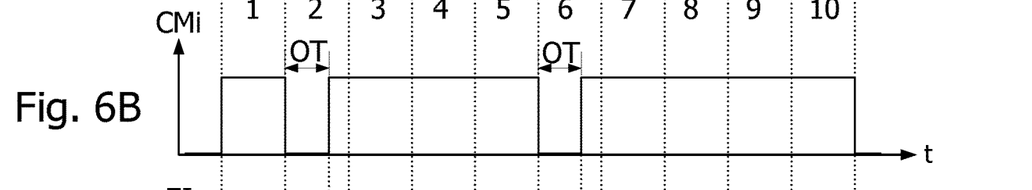
Figure 6C:
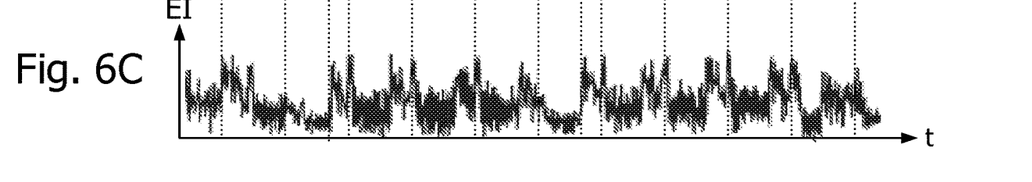

FIGS. 6A, 6B, 6C represent curves of variation over time, respectively of the clock signal CK, of the control signal CMi of the switch SWi emitted by the control circuit SWC, and of the intensity of the current El at the power supply input of the microcircuit IC1, during calculations performed by the component SHi. On FIG. 6B, the control signal CMi is kept in a high state, except during periods of the clock signal CK (numbered 2 and 6 in the example in FIG. 6A) where it is placed in the low state. The result is that the variations in current intensity that appear in the curve El during these periods 2 and 6 on FIG. 3B, due to the activity of the component SHi are no longer visible in the signal El measured at the power supply input of the microcircuit IC1. The variations in current that remain in the curve El during the periods 2 and 6 correspond to the current consumed by other circuits of the microcircuit IC1. The opening of the switch SWi thus enables the activity of the component SHi to be masked.

Figure 7:
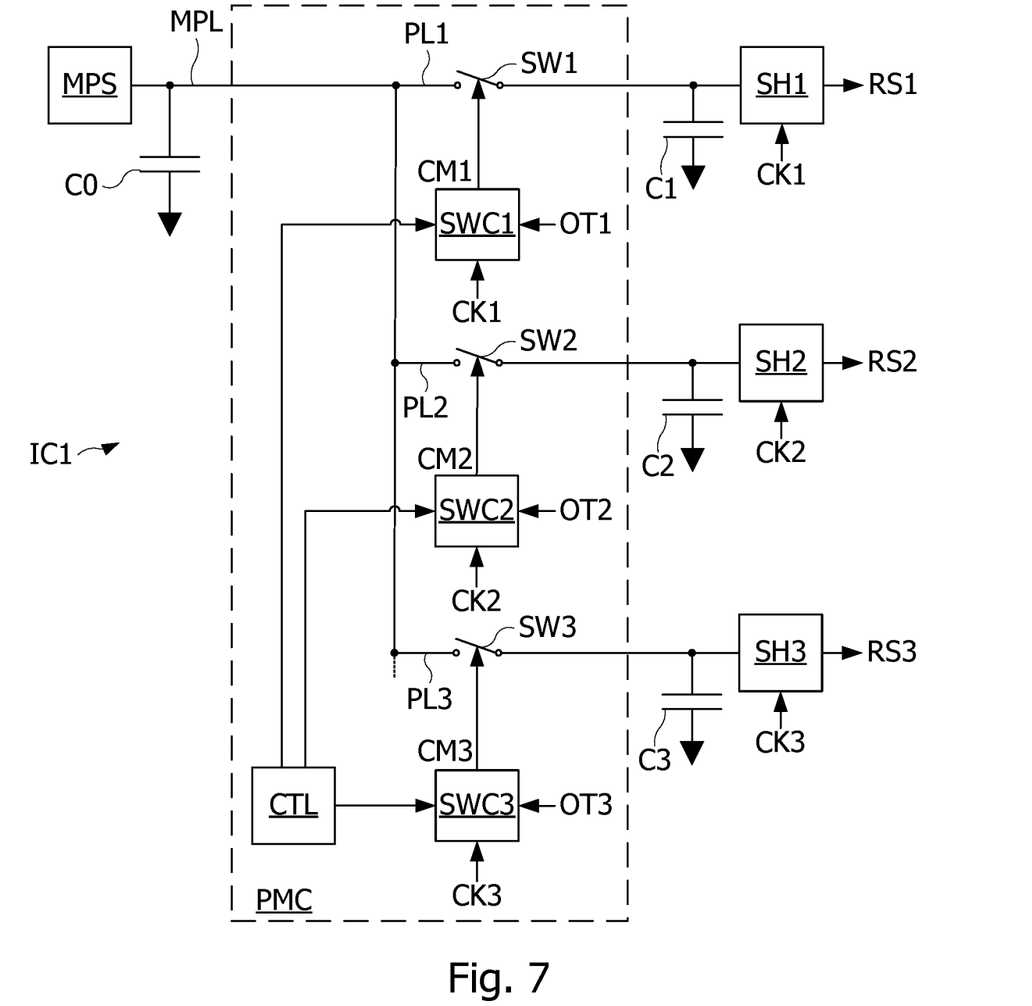

FIG. 7 represents several components SH1, SH2, SH3 of the microcircuit IC1 that must be protected against attacks of SPA or DPA type. Each component SH1, SH2, SH3 receives the supply voltage Vp provided by the circuit MPS at a supply input coupled to the main supply connection MPL through a local supply connection PL1, PL2, PL3. The supply input of each component SH1, SH2, SH3 is coupled to the ground plane of the microcircuit IC1 through a capacitor C1, C2, C3, respectively. The capacitors C1, C2, C3 may include the internal stray capacitances of the components SH1, SH2, SH3, respectively. According to one embodiment, the countermeasure circuit PMC comprises a switch SW1, SW2, SW3 interposed on the local supply connection PL1, PL2, PL3 of each component SH1, SH2, SH3, between the junction node of the local supply connection with the main supply connection MPL and the capacitor C1, C2, C3. In normal operation, the switches SW1, SW2, SW3 are closed. The components SH1, SH2, SH3 are thus supplied normally by the circuit MPS. When one of the switches SW1, SW2, SW3 is open, the corresponding component SH1, SH2, SH3 is supplied temporarily by the discharge of the corresponding capacitor C1, C2, C3. Each of the switches SW1, SW2, SW3 is controlled by a respective control circuit SWC1, SWC2, SWC3 that provides it with a control signal CM1, CM2, CM3. The control circuit CTL may control each of the control circuits SWC1, SWC2, SWC3. Each of the control circuits SWC1, SWC2, SWC3 may receive a control signal enabling the opening time OT1, OT2, OT3 of the corresponding switch SW1, SW2, SW3 to be adjusted. The opening time OT1, OT2, OT3 of each switch SW1, SW2, SW3 can be determined depending on the discharge time of the corresponding capacitor C1, C2, C3 so that during this time, the supply voltage provided by the capacitor is sufficient to keep operational the corresponding component SH1, SH2, SH3. Each of the control circuits SWC1, SWC2, SWC3 may also receive a respective clock signal CK1, CK2, CK3 enabling it to synchronize the opening of the corresponding switch SW1, SW2, SW3 with the operations performed by the corresponding component SH1, SH2, SH3.

Figure 8:
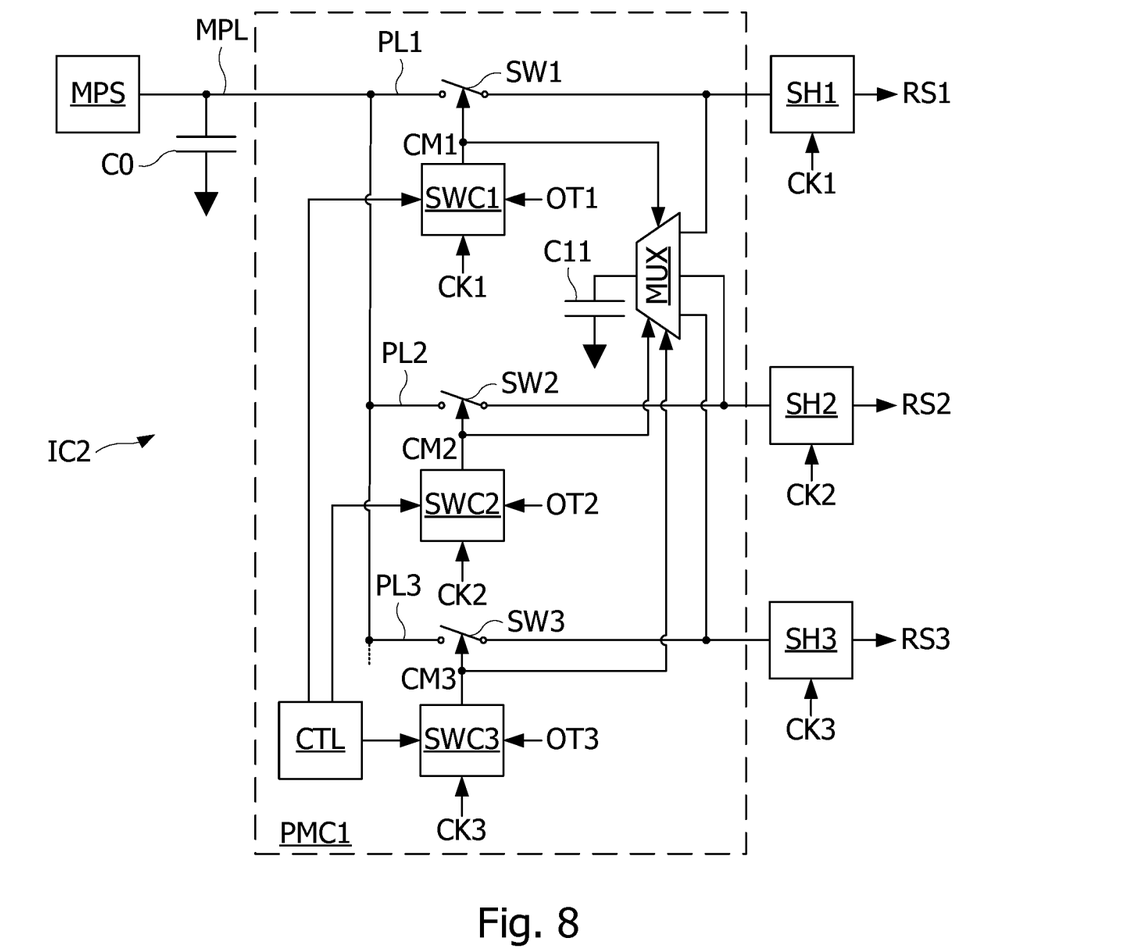

It is difficult for capacitors with a relatively high capacitance to be miniaturized in an integrated circuit. Therefore, with present-day integrated circuit manufacturing technologies, a 100 pF capacitor occupies a silicon substrate surface of the order of 100×100 μm. To limit the space occupied by such capacitors in the countermeasure circuit, the circuit in FIG. 7 may be modified so as to implement only one capacitor shared by all the components to be protected. Therefore, FIG. 8 represents a microcircuit IC2, and in particular a supply circuit of the microcircuit IC2. The supply circuit comprises the capacitor C0 and a countermeasure circuit PMC1 comprising a single capacitor C11 for all the components SH1, SH2, SH3. The capacitor C11 is connected, on one side, to the ground plane and coupled, on the other side, to each of the local supply connections PL1, PL2, PL3 through a multiplexer MUX. The multiplexer MUX is controlled by the control signals CM1, CM2, CM3 provided by the circuits SWC1, SWC2, SWC3 to the switches SW1, SW2, SW3. The multiplexer MUX may be configured to connect the capacitor C11 to only one of the connections PL1, PL2, PL3 at once. The control circuit CTL and/or the circuits SWC1, SWC2, SWC3 may be configured so that the control signals CM1, CM2, CM3 trigger the opening of a single switch SW1, SW2, SW3 at once, and control the multiplexer MUX so that it couples the capacitor C11 to the component SH1, SH2, SH3 connected to the open switch SW1, SW2, SW3. The control circuit CTL and/or the circuits SWC1, SWC2, SWC3 may also be configured to respect a minimum closing time between two consecutive openings from among the switches SW1, SW2, SW3, in order to ensure the recharging of the capacitor C11.

Figure 9:
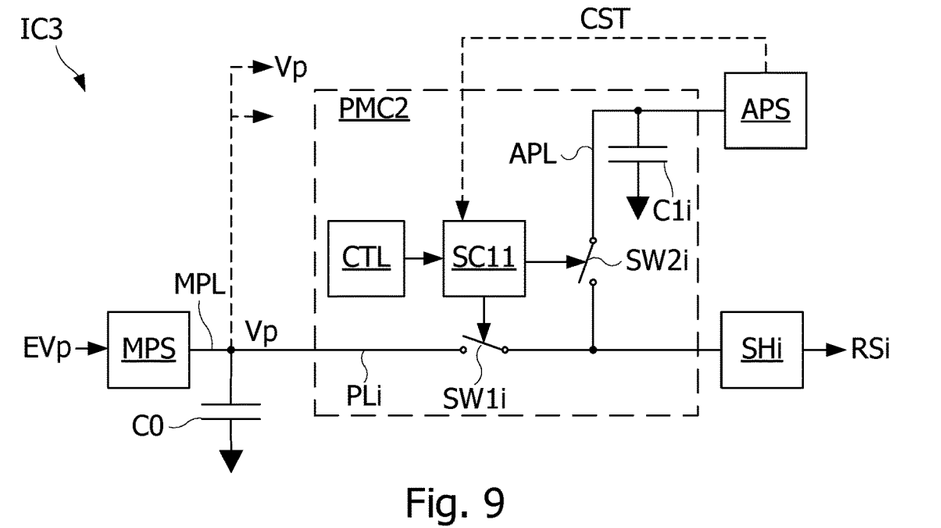

FIG. 9 represents a microcircuit IC3 and in particular a supply circuit for supplying a component SHi of the microcircuit IC3. The supply circuit comprises the supply circuit MPS, the capacitor C0, a countermeasure circuit PMC2 and another supply circuit APS. The supply circuit APS is configured to extract energy from a source of energy exploiting a physical phenomenon such as electromagnetic radiation (light, radio waves, magnetic field, electric field), motion, a temperature gradient, etc. For this purpose, the circuit APS may comprise as source of energy circuits such as an antenna, a motion sensor, light-sensitive cells, and circuits such as a charge pump and a voltage regulator.

The circuit PMC2 comprises a capacitor C1$i$, two switches SW1$i$, SW2$i$ controlled by a control circuit SC11, and a control circuit CTL. The supply line MPL connected to a supply output of the circuit MPS is coupled to a supply input of the component SHi through the switch SW1$i$. A supply line APL couples a supply output of the circuit APS to the supply input of the component SHi, the switch SW2$i$ being interposed on the line APL. The capacitor C1$i$ couples the supply output of the circuit APL to the ground. The circuit SC11 may be configured to control the switches SW1$i$, SW2$i$ so that, at any instant, only one of the switches SW1$i$ and SW2$i$ is closed when the component SHi is supplied.

According to one embodiment, the circuit APS provides the circuit SC11 or CTL with a state of charge signal CST of the capacitor C1$i$. Therefore, when the component SHi must be supplied, the switch SW2$i$ may be closed by the circuit SC11 while the signal CST indicates that the capacitor C1$i$ is charged, and opened while the signal CST indicates that the capacitor C1$i$ is discharged or on charge.

Figure 10:
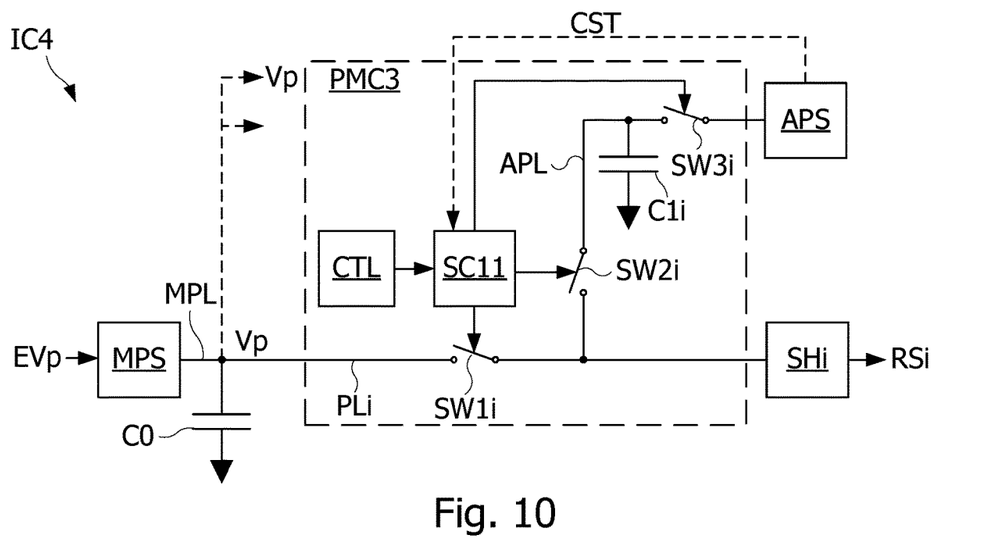

If the circuit APS is not totally isolated inside the microcircuit IC3, in particular because it must be connected to a connection port of the microcircuit (intended for example to be connected to an antenna) and if the activity of the component SHi may be detected at this port, in particular because the circuit APS does not offer sufficient isolation, provision may be made for a third switch interposed on the line APL. Therefore, FIG. 10 represents a microcircuit IC4 that differs from the microcircuit IC3 only in that the countermeasure circuit PMC3 comprises a third capacitor SW3$i$ interposed between the supply output of the circuit APS and the connection node of the capacitor C1$i$ to the line APL. The capacitor SW3$i$ is controlled by the circuit SC11 so as to be open when the switch SW2$i$ is closed and closed when the switch SW2$i$ is open.

It will be understood by those skilled in the art that the example implementations described herein are subject to various alternative embodiments and various applications. In particular, the appended claims, or claims that may be added hereafter, are not limited to the specific embodiments described, but also include all possible combinations of these embodiments. As an example, if the microcircuit in FIG. 9 or 10 comprises several components to be protected, each of these components may be associated with a capacitor C1$i$ and with respective switches SW1$i$ and SW2$i$ controlled by a control circuit such as SC11. Similarly, the embodiments in FIGS. 8 and 9 or 10 may be combined by adding to the multiplexer MUX on FIG. 8 an input connected to the supply circuit APS of FIG. 9 or 10.

The disclosed implementations are not limited either to the use of a capacitor to store electrical energy and to restore it to a component to be protected when the switch disposed on the supply connection of the component is open. Indeed, it is possible to consider integrating a rechargeable battery into the microcircuit. It is noted that, while the component is supplied by this other source of energy, the latter is not coupled to a contact outside the microcircuit, from which a DPA or SPA attack can be performed.

Figure 11:
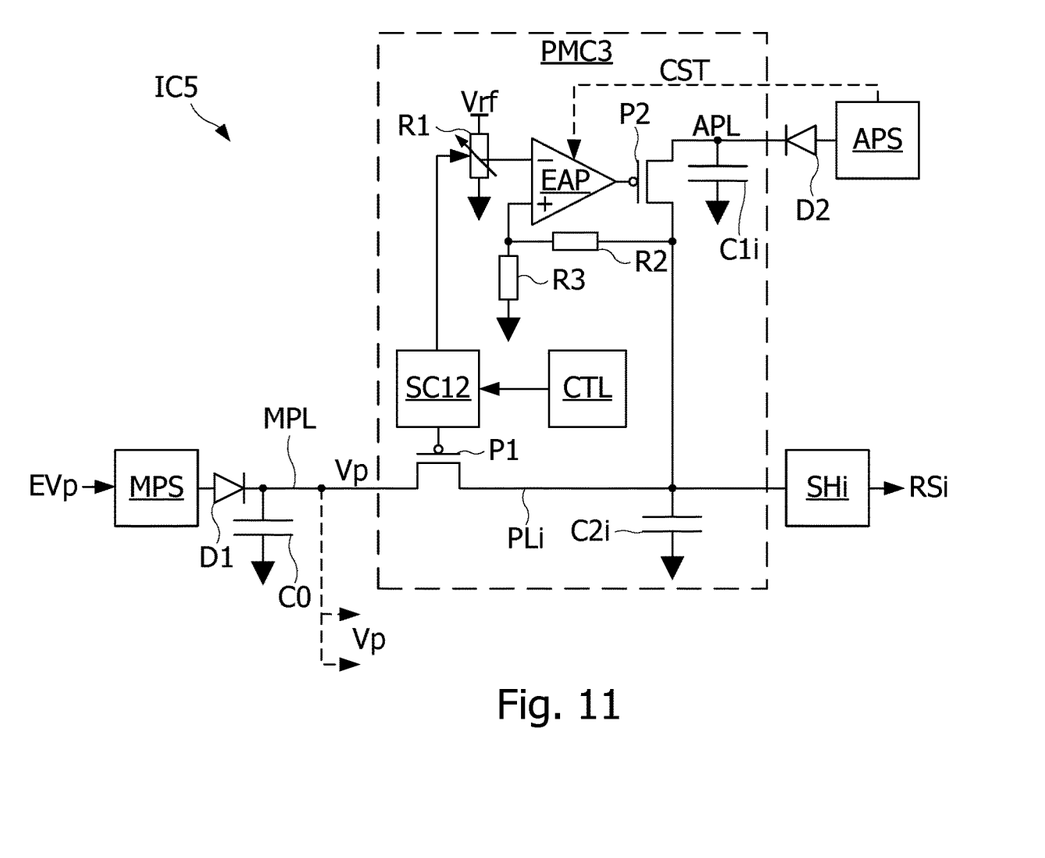

The disclosed implementations not limited either to the use of switches to connect the main MPS and secondary supply sources (such as the capacitor Ci, C1$i$) to a component to be protected that is internal to the microcircuit. Indeed, provision may be made for intermediate supply modes in which the component to be protected is supplied partly by the main supply source MPS and partly by the secondary supply source. This arrangement makes it possible to attenuate the signature due to the activity of the component to be protected, which may be detected by analyzing the current supplied and consumed by the microcircuit. This arrangement also enables the discharge time of the secondary supply source to be extended, and thus the time during which the component may be partially supplied by the secondary supply source. FIG. 11 represents as an example a microcircuit IC5 comprising a countermeasure circuit PMC3 which may implement such intermediate supply modes. The circuit PMC3 comprises a control circuit CTL, a control circuit SC12, two P-channel MOS transistors P1, P2, the capacitor C1$i$, an error amplifier EAP, a potentiometer R1 controlled by the control circuit SC12, and two resistors R2, R3. The transistor P1 is interposed on the supply line PLi of the component SHi and is controlled by the circuit SC12. The transistor P2 is interposed on the connection APL between the supply circuit APS and the supply input of the component SHi, and is controlled by the output signal of the amplifier EAP. The capacitor C1$i$ couples the supply output of the circuit APS to the ground. The supply input of the component SHi is coupled to a non-inverting input of the amplifier EAP through the resistor R2. The non-inverting input of the amplifier EAP is also coupled to the ground through the resistor R3. The amplifier EAP comprises an inverting input coupled to an intermediate terminal of the potentiometer R1 comprising an end terminal receiving a reference voltage Vrf and an end terminal connected to the ground. The activation of the amplifier EAP is controlled by the state of charge signal CST of the capacitor C1$i$ such that, if the state of charge of the capacitor C1$i$ is insufficient, the amplifier EAP inhibits the transistor P2. The resistors R2, R3 form a divider bridge making it possible to take off a portion of the voltage supplied at output by the supply circuit and sent by the transistor P2. Diodes D1, D2 may be provided at output of the supply circuits MPS, APS to avoid a reverse circulation of current. A capacitor C2$i$ may couple the supply input of the component SHi to the ground, provided that it has a low capacitance in relation to the capacitor C1$i$ (for example lower than $1/10$ of the capacitance of the capacitor C1$i$).

The potentiometer R1 enables the amplitude and the sign of the difference between the voltages supplied at input of the amplifier EAP to be adjusted, so as to adjust the supply current on the line APL, transmitted to the component SHi by the transistor P2, when the transistor P1 is on. Therefore, if the difference in voltage at input of the amplifier EAP is positive, then the current supplied by the capacitor C1$i$ prevails over the current supplied by the supply circuit MPS, to supply the component SHi. On the other hand, if the difference in voltage at input of the amplifier EAP is negative, the current supplied by the supply circuit prevails over the current supplied by the capacitor C1$i$, to supply the component SHi.

Furthermore, the switch interposed on the main supply line PLi of the component to be protected is not necessarily open during the execution of a sensitive operation by the component. Indeed, masking the activity of the component while the latter performs non-sensitive operations may also disturb a DPA or SPA attack.

What is claimed is:
1. A method comprising:
selecting, by a microcircuit, based on a clock signal of the microcircuit, a power supply mode of a component internal to the microcircuit, the power supply mode being selected from:
a first power supply mode in which the component is supplied with power only by a first power supply circuit connected to a power supply input of the microcircuit; and
a second power supply mode in which the component is at least partially supplied with power by a second power supply circuit internal to the microcircuit;
in response to the first power supply mode being selected, charging a fixed capacitor of the second power supply circuit by a source of energy internal to the microcircuit; and
in response to the second power supply mode being selected, isolating, using a switch device internal to the microcircuit, the second power supply circuit from being accessed from an exterior of the microcircuit, and discharging the fixed capacitor to supply the component with power.

2. The method of claim 1, wherein the selection of the second power supply mode for a cycle of the clock signal is determined randomly.

3. The method of claim 1, wherein the selection of the second power supply mode for a cycle of the clock signal is based on a state of charge of the fixed capacitor.

4. The method of claim 1, wherein the selection of the second power supply mode for a cycle of the clock signal is based on a criterion of a sensitivity of an operation being executed by the component.

5. The method of claim 1, wherein the component is provided with the clock signal to pace operations executed by the component.

6. The method of claim 1, wherein the second power supply mode is selected for a period of time that is shorter than a period of time of a cycle of the clock signal minus a charge time for charging the fixed capacitor.

7. The method of claim 1, wherein a first switch is interposed on a power supply connection of the component and connected to the first power supply circuit, the method further comprising:
charging the fixed capacitor of the second power supply circuit when the first switch is closed; and
discharging the fixed capacitor to supply the component with power when the first switch is open.

8. The method of claim 7, wherein a second switch is interposed on a power supply connection linking the second power supply circuit to a power supply input of the component, the fixed capacitor being:
charged by the source of energy internal to the microcircuit when the second switch is open; and
discharged to supply the component with power when the second switch is closed.

9. The method of claim 7, further comprising:
performing, by the component, a first execution of an operation with the first switch open for a first period of time, the fixed capacitor being in a charged state when the first switch is opened;
storing, during the first execution, a first datum provided by the component;
performing, by the component, a second execution of the operation with the first switch open for a second period of time, the second period of time being different than the first period of time;
storing during the second execution, a second datum provided by the component; and
determining, based on a comparison of the first datum and the second datum, a time duration that the first switch can be open without disturbing execution of the operation.

10. The method of claim 1, further comprising:
defining and storing, in a register, a control word including one control bit per cycle of a set of cycles of the clock signal; and
selecting one of the first power supply mode and the second power supply mode,
the selecting one of the first power supply mode and the second power supply mode being based on a value of a respective control bit in the register that corresponds to a clock cycle that is in progress.

11. A microcircuit comprising:
a component;
a first power supply circuit connected to a power supply input of the microcircuit;
a second power supply circuit internal to the microcircuit; and
a control circuit configured to:
select, based on a clock signal, a power supply mode of the component internal to the microcircuit, the power supply mode being selected from:
a first power supply mode in which the component is supplied with power only by the first power supply circuit; and
a second power supply mode in which the component is at least partially supplied with power by the second power supply circuit;
in response to the first power supply mode being selected, charge a fixed capacitor of the second power supply circuit by a source of energy internal to the microcircuit; and
in response to the second power supply mode being selected, isolate, using a switch device internal to the microcircuit, the second power supply circuit from being accessed from an exterior of the microcircuit, and discharge the fixed capacitor to supply the component with power.

12. The microcircuit of claim 11, further comprising a first switch interposed on a power supply line of the component, the first switch being configured to be:
closed by the control circuit to supply the component with power by the first power supply circuit; and
opened by the control circuit to supply the component with power by the second power supply circuit.

13. The microcircuit of claim 12, wherein the second power supply circuit includes a first fixed capacitor that is configured to:
charge when the first switch is closed; and
discharge to supply the component with power when the first switch is open.

14. The microcircuit of claim 13, further comprising a second switch interposed on a power supply connection and linking the second power supply circuit to the power supply input of the component,
the first fixed capacitor being configured to be:
charged by the source of energy internal to the microcircuit when the second switch is open; and
discharged to supply the component with power when the second switch is closed.

15. The microcircuit of claim 12, further comprising a register configured to store a control word including at least one bit, a status of the at least one bit indicating whether to open or close the first switch during a calculation cycle of a plurality of calculation cycles executed by the component, the at least one bit corresponding with the calculation cycle to the plurality of calculation cycles.

16. The microcircuit of claim 11, wherein the component is included in a plurality of components of the microcircuit, each component including:
a power supply input coupled to the first power supply circuit through a switch; and
a fixed capacitor coupled with the power supply input, the switch being controlled based on operations being executed by a respective component of the plurality of components.

17. The microcircuit of claim 11, wherein the component is included in a plurality of components of the microcircuit, each component including:
a power supply input coupled to the first power supply circuit through a first switch; and
a fixed capacitor coupled to the power supply input through a second switch, the first switch and the second switch being controlled based on operations being executed by a respective component of the plurality of components, the second switch being configured to couple the fixed capacitor to the power supply input when the first switch is open.

18. The microcircuit of claim 11, wherein the control circuit is further configured to randomly select the second power supply mode for a cycle of the clock signal.

19. The microcircuit of claim 11, wherein the control circuit is further configured to select the second power supply mode for a cycle of the clock signal based on at least one of a state of charge of the fixed capacitor and a criterion of a sensitivity of an operation being executed by the component.

20. The microcircuit of claim 11, wherein the component is configured to execute operations paced by the clock signal.

21. The microcircuit of claim 11, wherein the control circuit is further configured to select the second power supply mode for a period of time that is shorter than a period of time of a cycle of the clock signal minus a charge time for charging the fixed capacitor.

\* \* \* \* \*